United States Patent [19]

Saito

[11] Patent Number: 4,793,686

[45] Date of Patent: Dec. 27, 1988

[54] OPTICAL FIBER COMPOSITE OVERHEAD TRANSMISSION LINE AND METHOD FOR PRODUCING SAME

[75] Inventor: Yasunori Saito, Kanagawa, Japan

[73] Assignee: Sumitomo Electric Industries, Ltd., Osaka, Japan

[21] Appl. No.: 610,938

[22] Filed: May 17, 1984

Related U.S. Application Data

[63] Continuation of Ser. No. 394,959, Jul. 2, 1982, abandoned.

[30] Foreign Application Priority Data

Jul. 7, 1981 [JP] Japan .................................. 56-106560

[51] Int. Cl.⁴ .................................................. G02B 6/44
[52] U.S. Cl. .................................................. 350/96.23
[58] Field of Search ..................................... 350/96.23

[56] References Cited

U.S. PATENT DOCUMENTS

| 4,166,670 | 9/1979 | Ramsay | 350/96.23 |
| 4,190,319 | 2/1980 | Eggleston | 350/96.23 |
| 4,278,835 | 7/1981 | Jackson | 350/96.23 X |
| 4,341,440 | 7/1982 | Trezeguet et al. | 350/96.23 |
| 4,359,598 | 11/1982 | Dey et al. | 350/96.23 X |
| 4,388,485 | 6/1983 | Zeidler et al. | 350/96.23 X |
| 4,408,828 | 10/1983 | Le Noane et al. | 350/96.23 |
| 4,416,508 | 11/1983 | Dey et al. | 350/96.23 |

FOREIGN PATENT DOCUMENTS 3027357 2/1982 Fed. Rep. of Germany ... 350/96.23

OTHER PUBLICATIONS

"Field Trial of Composite Fiber-Optic Overhead Ground Wire", Kubota et al.

Primary Examiner—William L. Sikes
Assistant Examiner—Akm E. Ullah
Attorney, Agent, or Firm—Sughrue, Mion, Zinn, Macpeak & Seas

[57] ABSTRACT

An optical fiber composite overhead transmission line includes a spacer formed with spiral grooves filled with a jelly-like material into which optical fibers are buried. A cover or sheath surrounds the spacer member to protect the internal components.

3 Claims, 2 Drawing Sheets

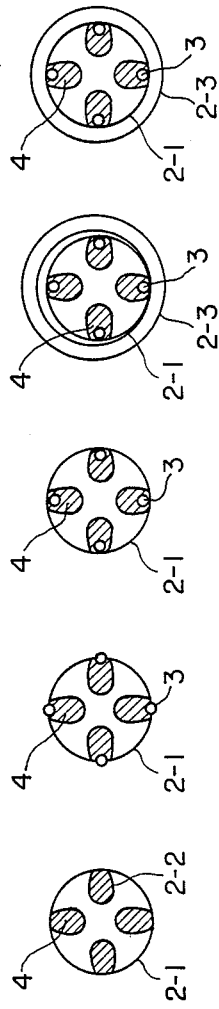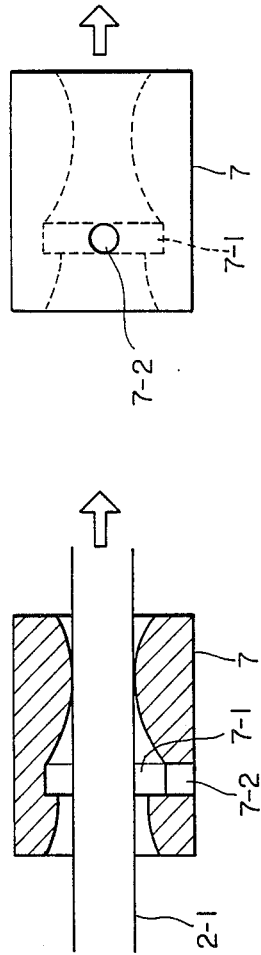

OPTICAL FIBER COMPOSITE OVERHEAD TRANSMISSION LINE AND METHOD FOR PRODUCING SAME

This application is a continuation of application Ser. No. 394,959, filed 07/02/82 abandoned.

BACKGROUND OF THE INVENTION

This invention relates to an optical fiber composite overhead transmission line cable obtained by providing an optical fiber cable unit inside an electric aerial transmission line formed by stranding a plurality of electrical conductors, or in an overhead earth (ground) wire which is extended in parallel with such an overhead transmission line.

Optical fiber cables have been extensively used as signal transmission media, and have specific features in that not only are they large in data transmission capacity, but they are also free from electromagnetic induction. Accordingly, an optical fiber cable or unit can be incorporated in an overhead transmission line or an ordinary power line. That is, the optical fiber cable provides a great economical effect in that it is unnecessary to additionally install a separate optical communication cable.

Heretofore, in order to incorporate the optical fiber cable into an overhead electrical transmission line, some of the outer stranded electrical conductors forming the overhead transmission line are replaced by an optical fiber cable unit (hereinafter referred to as "an optical fiber unit") which is obtained by incorporating a plurality of optical fibers in a metal tube. In the above-described conventional construction, the wall thickness of the metal tube covering the optical fiber unit is generally small because of dimensional limitations. Accordingly, the metal tube is insufficient in mechanical strength and accordingly cannot sufficiently protect the optical fibers from damage. Thus, the outer cover is liable to be damaged and water may enter the optical fiber unit.

On the other hand, since it is difficult to increase the inside diameter of the metal tube, it is considerably difficult to increase the percentage of twist of the optical fiber cable itself, and accordingly it is impossible to form a cable with the optical fibers slackened.

SUMMARY OF THE INVENTION

This invention is intended to provide an optical fiber composite overhead transmission line of novel construction which eliminates the above-described difficulties, and a method of manufacturing such a line.

BRIEF DESCRIPTION OF THE DRAWINGS

This invention will be described with reference to the accompanying drawings, wherein:

FIGS. 4a–4e are sectional views of the overhead transmission line at various manufacturing steps; and FIGS. 5a and 5b are explanatory diagrams showing a collecting die of FIG. 3.

DETAILED DESCRIPTION OF THE PREFERRED EMBODIMENTS

Figure 1:
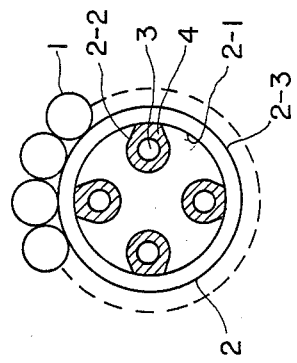
FIGS. 1 and 2 are sectional views showing an optical fiber composite overhead transmission line according to this invention.

FIG. 1 shows one example of an optical fiber composite overhead transmission line. An optical fiber unit 2 is disposed along the common axis of external stranded electrical conductors 1. The optical fiber cable unit 2 is made up of a spacer 2-1 having spiral grooves 2-2 in its outer wall, a metal tube 2-3 which covers the outer wall of the spacer 2-1, and optical fibers 3. The spiral grooves 2-2 are filled with a jelly-like material 4, which is fluidic or substantially fluidic at room temperature, such as an aqueous solution of petroleum jelly, polyisobutylene, non-cross linked silicon resin, silicon oil or polyvinyl alcohol.

The optical fibers 3 are placed in the grooves cut in the spacer, and the spacer is covered with the metal tube 2-3. Therefore, the optical fibers are sufficiently protected from external forces, and are packaged in a substantially water-proof manner.

Since the grooves 2-2 of the spacer 2-1 are filled with the jelly-like material, the optical fiber unit 2 is efficiently protected from the entrance of water even when the metal tube 2-3 is damaged, and the optical fibers are stably arranged in the grooves toward the outer wall of the spacer.

As the optical fibers are located in the grooves adjacent the spacer outer wall, they are maximumly stranded, which will substantially absorb any elongation which may be caused when the composite overhead transmission line is installed.

Figure 2:
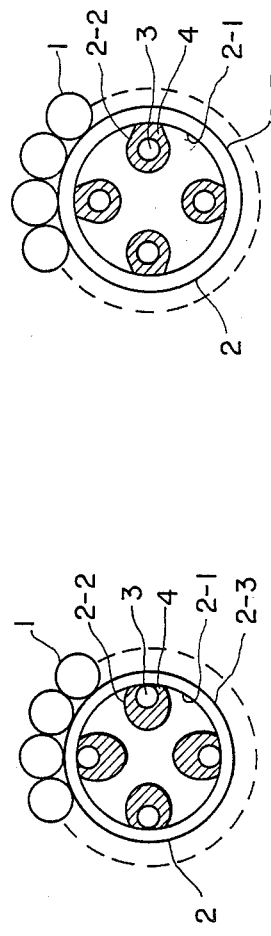

FIG. 2 is a sectional view of an optical fiber composite overhead transmission line which has been elongated when installed.

When the transmission line is installed, the optical fibers incorporated in the grooves 2-2 are caused to move from the outer wall of spaces 2-1 to substantially the middle points of the respective grooves, as a result of which the optical fibers are not elongated, i.e., the transmission line elongation is absorbed. The absorption of elongation depends on the outside diameter D of the spacer, the groove depth h and the spiral pitch P. The absorption is as indicated in the following Table 1, with the outside diameter d of each optical fiber strand being 0.7 mm.

TABLE 1

| (P = 150 mm) | | | | | | |
|---|---|---|---|---|---|---|
| D (mm) | 4 | | | 6 | | |
| h (mm) | 1.0 | 1.2 | 1.3 | 1.0 | 1.2 | 1.5 |
| Absorption of elongation ε (%) | 0.08 | 0.12 | 0.14 | 0.13 | 0.21 | 0.25 |

$$\epsilon = \frac{2\pi^2(D-h)(h-d)}{P^2}$$

In the above-described composite overhead transmission line, the grooves in the spacer 2-1 are filled with jelly-like material. However, it should be noted that one object of this invention is to allow the transmission line to be stretched during installation while avoiding any elongation of the fibers, i.e., to form the fibers with slackening. In this connection, the optical fibers can be placed in the peripheral portions of the grooves without filling the grooves with the jelly-like material 4. This can be achieved by applying a greater feed force to the optical fibers 3 than that to the spacer 2-1 to avoid any application of tension to the fibers during assembly, to position the optical fibers at radially outward portions of the grooves 2-2.

This arrangement is advantageous in the following points: Even if the thickness of the metal cover 2-3 is reduced, the optical cable fiber is not collapsed unit 2 broken because of the presence of the spacer 2-1. Therefore, the unit 2 is maintained water-proof without filling the grooves with the jelly-like material.

In order to improve the stability of the optical fibers in the grooves, the section of each groove 2-2 should be such that the inner part is equal to or larger than the opening part thereof in size.

The outer cover 2-3 of the optical fiber unit 2 is a metal tube, as described above. The cover serves not only to protect the cable 2 from external forces or moisture but also to improve the temperature characteristic of the optical fibers. The overhead transmission line often undergoes a high temperature of several hundreds of degrees centigrade (C) because of an induction current or lightning current or short circuit current. If the thermal expansion coefficient of the optical fibers is larger than that of the spacer, then the optical fibers are brought into contact with the inner wall of the metal tube 2-3 as shown in FIG. 1, when the temperature is increased, and are then moved back as shown in FIG. 2 when the temperature is decreased. On the other hand, if the thermal expansion coefficient of the optical fibers is smaller than that of the spacer, then the optical fibers are positioned as shown in FIG. 1 at low temperatures for instance at night, and are positioned as shown in FIG. 2 at high temperatures, for instance during daytime. Although the optical fibers are thermally expanded and contracted as described, they are not slightly bent, because the plastic covers of the optical fibers are slidable on the surface of the metal tube 2-3. Therefore, the transmission loss variation is maintained at a minimum. According to the result of experimentation, it has been confirmed that, in the case where a material such as a coarsely wound tape or string is interposed between the spacer and the metal tube in order to hold the optical fibers in the grooves in the spacer, the fibers cannot smoothly move when the temperature changes, and accordingly the transmission loss is greatly increased.

The spacer 2-1 may be made of metal or non-metal. However, in order to maintain the characteristic of the optical fibers stable, it is desirable that the thermal expansion coefficient of the material of the spacer be substantially equal to that of the material of the metal tube 2-3. It is advantageous from the point of view of both the thermal expansion coefficient and mechanical strength that the spacer be made of a metal material such as aluminum, iron or copper, or a non-metal material such as fiber-reinforced plastic.

Figure 3:
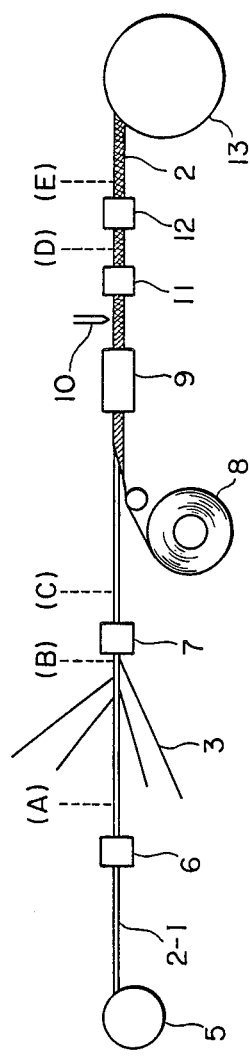
FIG. 3 is an explanatory diagram illustrating a method of manufacturing the overhead transmission line according to the invention.

FIG. 3 shows one example of a method of manufacturing an optical fiber composite overhead transmission line according to the invention. The spacer 2-1 in which the spiral grooves have been cut is fed from a supply reel 5. The spacer 2-1 thus fed is passed through a jelly-like material filling device 6, so that the grooves 2-2 thereof are filled with petroleum jelly 4. Thereafter, the optical fibers 3 are supplied from rotary cages and are buried in the petroleum jelly 4 near the openings of the grooves. In this condition, the spacer is delivered to a metal tube covering device, where the spacer and the optical fibers in the grooves are covered by the metal tube. The metal tube 2-3 is formed by a conventional method in which a shaping device 9 is used to butt-joint a metal tape 8 to provide a butt-jointed cylinder, and the cylinder thus provided is butt-welded. In FIG. 3, reference numeral 10 designates a welding electrode.

FIG. 4 shows sections of the optical fiber unit in various stages of the manufacturing process in the case where the unit is manufactured according to the above-described method. More specifically, FIG. 4a shows the petroleum jelly 4 filled in the grooves 2-2 in the spacer 2-1 at the point A immediately after the filling device 6, FIG. 4b shows the optical fibers being put on the petroleum jelly 4 near the openings of the grooves at the point B, and FIG. 4c shows the optical fiber unit at the point C immediately after a collecting die 7. FIG. 4d shows the optical fiber unit including the metal tube at the point D immediately after a cooling device 11, and FIG. 4e shows the optical fiber unit at the point E immediately after a diameter reducing device 12 arranged before a winding reel 13. In the manufacturing method, after the petroleum jelly or the like is filled in the grooves cut in the spacer, the optical fibers are buried in the petroleum jelly in the grooves and near the periphery of the spacer. Under this condition, the spacer is covered with the metal tube, to form the optical fiber unit. Therefore, the method is advantageous in that the optical fibers can be stably and positively arranged in the grooves in the spacer and near the periphery of the latter.

In the above-described embodiment, the metal tube or cover 2-3 is made according to a welding method; however, it goes without saying that it may be manufactured according to other conventional tube manufacturing techniques, such as for instance an extrusion molding method. It is desirable that the collecting die be designed so that it, as shown in FIGS. 5a and 5b, includes an internal cavity 7-1 and a passage 7-2 extended outwardly from the cavity 7-1. In this case, even if the petroleum jelly is partly pushed out of the grooves when the optical fibers are buried in the grooves, the petroleum jelly thus pushed out can be removed, and the operation of incorporating the optical fibers in the grooves can be protected from being affected by excessive jelly.

What is claimed is:

1. An optical fiber composite overhead transmission line comprising: at least one stranded substantially cylindrical wire layer which includes a plurality of tension-resisting outer metal electrical conductor wires; a central cylindrical housing member extending along the axis of said layer and including a substantially cylindrical inner spacer formed with spiral grooves in its outer peripheral surface, and a cylindrical metal cover disposed over said spacer and having an inner wall in close contact with said spacer, wherein said spacer is made of insulation material; and optical fibers housed in said spiral grooves and positioned at the radially outer portion of said spacer when said transmission line is not elongated by tension, thereby protecting said fibers from lightning and from tensile forces applied to the transmission line.

2. An optical fiber composite overhead transmission line comprising: at least one stranded substantially cylindrical wire layer which includes a plurality of tension-resisting outer metal electrical conductor wires; a central cylindrical housing member extending along the axis of said layer and including a substantially cylindrical inner spacer formed with spiral grooves in its outer peripheral surface, and a cylindrical metal cover disposed over said spacer and having an inner wall in close contact with said spacer; and optical fibers housed in said spiral grooves and positioned at the radially outer portion of said spacer when said transmission line is not elongated by tension, thereby protecting said fibers from lightning and from tensile forces applied to the transmission line; wherein said central cylindrical housing member is inside said cylindrical wire layer and extends along the longitudinal axis of said cylindrical wire layer, and wherein said optical fibers are positioned adjacent said inner wall of said cover; and wherein said optical fibers are in contact with said inner wall of said cover when said transmission line is not elongated by tension.

3. A composite overhead transmission line as claimed in claim 21 further comprising a jelly-like material completely filling said grooves, said optical fibers being movable within said jelly-like material, said optical fibers being radially inwardly movable within said jelly-like material so as to migrate radially towards the center of said transmission line when said transmission line is elongated by tension.

* * * * *